United States Patent
Kraus et al.

(10) Patent No.: US 9,709,181 B2
(45) Date of Patent: Jul. 18, 2017

(54) ASSEMBLY

(71) Applicant: ROBERT BOSCH GMBH, Stuttgart (DE)

(72) Inventors: Juergen Kraus, Pettstadt (DE); Dietmar Schmieder, Markgroeningen (DE); Tilo Landenfeld, Vaihingen/Enz (DE); Juergen Ebert, Altendorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 46 days.

(21) Appl. No.: 14/385,385

(22) PCT Filed: Feb. 18, 2013

(86) PCT No.: PCT/EP2013/053208
§ 371 (c)(1),
(2) Date: Sep. 15, 2014

(87) PCT Pub. No.: WO2013/135460
PCT Pub. Date: Sep. 19, 2013

(65) Prior Publication Data
US 2015/0059882 A1    Mar. 5, 2015

(30) Foreign Application Priority Data

Mar. 16, 2012 (DE) .......... 10 2012 204 216

(51) Int. Cl.
| | |
|---|---|
| *B05B 1/08* | (2006.01) |
| *F16K 15/02* | (2006.01) |
| *F02M 63/00* | (2006.01) |
| *F02M 51/06* | (2006.01) |
| *F02M 61/08* | (2006.01) |
| *F02M 61/12* | (2006.01) |
| *B05B 17/06* | (2006.01) |

(52) U.S. Cl.
CPC ......... *F16K 15/02* (2013.01); *F02M 51/0603* (2013.01); *F02M 61/08* (2013.01);
(Continued)

(58) Field of Classification Search
CPC .................... Y10T 137/7922; Y10T 137/7927
(Continued)

(56) References Cited

U.S. PATENT DOCUMENTS

| | | | |
|---|---|---|---|
| 6,705,544 B1 * | 3/2004 | Rueger ............... | F02D 41/2096 239/102.2 |
| 2002/0134855 A1 * | 9/2002 | Lorraine ............ | F02M 51/0603 239/102.2 |
| 2003/0150939 A1 * | 8/2003 | Lorraine ............ | F02M 51/0603 239/533.2 |

(Continued)

FOREIGN PATENT DOCUMENTS

| | | |
|---|---|---|
| DE | 101 59 749 | 6/2003 |
| DE | 10 2007 002402 | 6/2008 |

(Continued)

OTHER PUBLICATIONS

Machine Translation of EP1519035. Printed May 9, 2016.*
International Search Report for PCT/EP2013/053208, dated May 31, 2013.

*Primary Examiner* — R. K. Arundale
(74) *Attorney, Agent, or Firm* — Norton Rose Fulbright US LLP; Gerard Messina

(57) ABSTRACT

An assembly includes: a first component; a second component enclosed by the first component; a diaphragm that covers a radial gap between the first and second components and is fixed in each case in a sealed manner; and a volume of a medium that is enclosed by the first and second components and the diaphragm. For the purpose of achieving a simple filling process of the assembly with the medium at a reliable sealing of the enclosed volume, even in the case of high, swelling pressures acting upon the assembly, in one of the components a filling valve is situated that opens towards the volume, which filling valve is situated as a check valve having spring resetting in a filling channel running in the component.

24 Claims, 5 Drawing Sheets

(52) U.S. Cl.
CPC ........ *F02M 61/12* (2013.01); *F02M 63/0001* (2013.01); *B05B 17/0623* (2013.01); *F02M 2200/16* (2013.01); *F02M 2200/21* (2013.01); *F02M 2200/26* (2013.01); *Y10T 137/7922* (2015.04); *Y10T 137/7927* (2015.04)

(58) Field of Classification Search
USPC .......... 239/583–585.5; 251/129.05; 267/161, 267/163
See application file for complete search history.

(56) References Cited

U.S. PATENT DOCUMENTS

| | | | |
|---|---|---|---|
| 2004/0118950 A1* | 6/2004 | Hohl | F02M 51/0603 239/584 |
| 2004/0164175 A1* | 8/2004 | Maeurer | F02M 51/0603 239/102.2 |
| 2005/0247803 A1* | 11/2005 | Liskow | F02M 51/005 239/102.2 |
| 2006/0043213 A1* | 3/2006 | Gerschwitz | F02M 51/0603 239/102.2 |

FOREIGN PATENT DOCUMENTS

| | | |
|---|---|---|
| DE | 10 2009 047009 | 5/2011 |
| EP | 1 519 035 | 3/2005 |
| EP | 1 708 405 | 5/2007 |
| EP | 1 813 805 | 8/2007 |
| JP | 3622630 | 8/1961 |
| JP | H08303617 A | 11/1996 |
| JP | 2005513334 A | 5/2005 |

* cited by examiner

ASSEMBLY

BACKGROUND OF THE INVENTION

1. Field of the Invention

The present invention relates to an assembly, e.g., for sealing components of a valve.

2. Description of the Related Art

A known assembly for sealing a force transmission element (which is described in published German patent application document DE 10 2009 047 009 A1) guided in a duct in a body is used in a fuel injector in fuel injection systems for internal combustion engines for sealing components of the valve, that are not resistant to fuel, such as the piezoelectric actuator for the valve control, from the fuel present in a valve chamber of the valve under system pressure. The valve chamber is bordered by a valve housing and a valve body that is fixed to the valve housing in a sealed manner. The valve body has a duct for a valve needle, which extends from a valve opening arranged in front of the valve chamber up to the actuator. In the area of the duct, the valve needle carries a slide ring, fixed on it, which borders a narrow radial gap with the valve body within the duct. In order to prevent the passage of the fuel through this radial gap, the end face of the valve body bordering the valve chamber is covered by an annular diaphragm, which with its inner edge is fixed on the slide ring and its outer edge on the valve body. The region on the valve body covered by the diaphragm is filled with a medium.

The medium has a yield stress which is selected as a function of the fuel pressure prevailing in the valve chamber, for example, a soft mass having a high yield stress, such as a Bingham fluid, viscous silicone oil or transformer oil. In order to fill the covering region of the diaphragm with the medium, a chamber is present in the valve body, which subdivides the valve body into a front and a rear body part. In the front body part, a connection to the covering region is produced and in the rear body part, using the slide ring, the sliding guide of the valve needle in the valve body is implemented. The filling of the chamber with the medium takes place via a filling hole inserted into the valve needle, which opens out into the chamber. After the filling in of the medium, the filling hole is closed by pressing in a ball.

BRIEF SUMMARY OF THE INVENTION

The assembly according to the present invention has the advantage that, using the filling valve present in one of the components, on the one hand, the constructive design of the assembly for filling with medium is clearly simplified, and on the other hand, the filled medium volume is reliably sealed even in the case of high and swelling pressures acting upon the assembly. In particular, when the filling valve is acting as a check valve, the increase in the pressure in the medium volume leads to an additional pressure on the valve member of the check valve and reinforces the closing force of the valve. By contrast to the known sealing of the enclosed medium volume using a ball pressed into the component, a relatively soft material does not have to be selected for the purpose of pressing in the ball, but rather, a quite hard material may advantageously be used. The installation of the filling valve is simple and has high process reliability. The filling process, for which venting the assembly is required, may be carried out advantageously using the filling valve in two stages and, if necessary, also in two different process stations, by first venting the assembly by opening the filling valve, and subsequently inserting the medium by renewed opening of the filling valve.

According to one advantageous specific embodiment of the present invention, the filling valve is situated in a filling channel which runs in the one component and is accessible at the outside of the assembly. Consequently, the integrated filling valve remains easily accessible for the venting and the filling process, and by a corresponding design of the filling channel, one is able to implement at the same time components of the filling valve such as valve seat and valve chamber having inlet and outlet.

For this purpose, according to one advantageous specific embodiment of the present invention, the filling channel is developed as a stepped hole having a first boring section and a second boring section having a larger diameter than the first, and, at the transition of the boring sections, a valve seat for a valve member. The valve member is preferably a steel ball coated with PTFE, and the valve seat, for optimal sealing of the ball, has an angle of slope a of between 5° and 60°, measured with respect to the axis of the bores.

According to one advantageous specific embodiment of the present invention, the stepped hole has a third boring section adjoining the second boring section, the third boring section, having an enlarged diameter compared to the second boring section, being situated eccentrically to the boring axis. A spring arm subjecting the valve member or the ball to pressure in the direction of the valve seat is fastened in the third boring section. The spring arm implements a thin-profile return spring or valve closing spring of the filling valve, having a small installation space and having sufficient closing force, pressure acting on the assembly being advantageously transmitted by the medium volume to the spring arm and the valve member, and increasing the closing force of the valve.

According to one advantageous specific embodiment of the present invention, the spring arm is stamped out of the shell bottom as a part of a shell-shaped spring element having a shell bottom and a shell edge, and the spring element is placed into the third boring section and fixed by pressing in or welding in the shell edge. Such a spring element may be made cost-effectively as a simple stamped and bent part of high-strength stainless steel. The closing force of the valve may be set by establishing a certain press-in depth of the spring element into the third boring section.

The assembly according to the present invention is used advantageously in valves for metering fluid, particularly for the dosing injection of fuel in fuel injection systems of internal combustion engines, and, in this case, is drawn upon for generating a sealing assembly for sealing a valve chamber from fluid outflow or an hydraulic coupler for compensating for different thermal expansions of the valve housing and a force-transmitting element that is axially supported in the valve housing, such as a piezoelectric actuator or a magnetostrictive actuator and a valve needle.

DETAILED DESCRIPTION OF THE INVENTION

Figure 2:
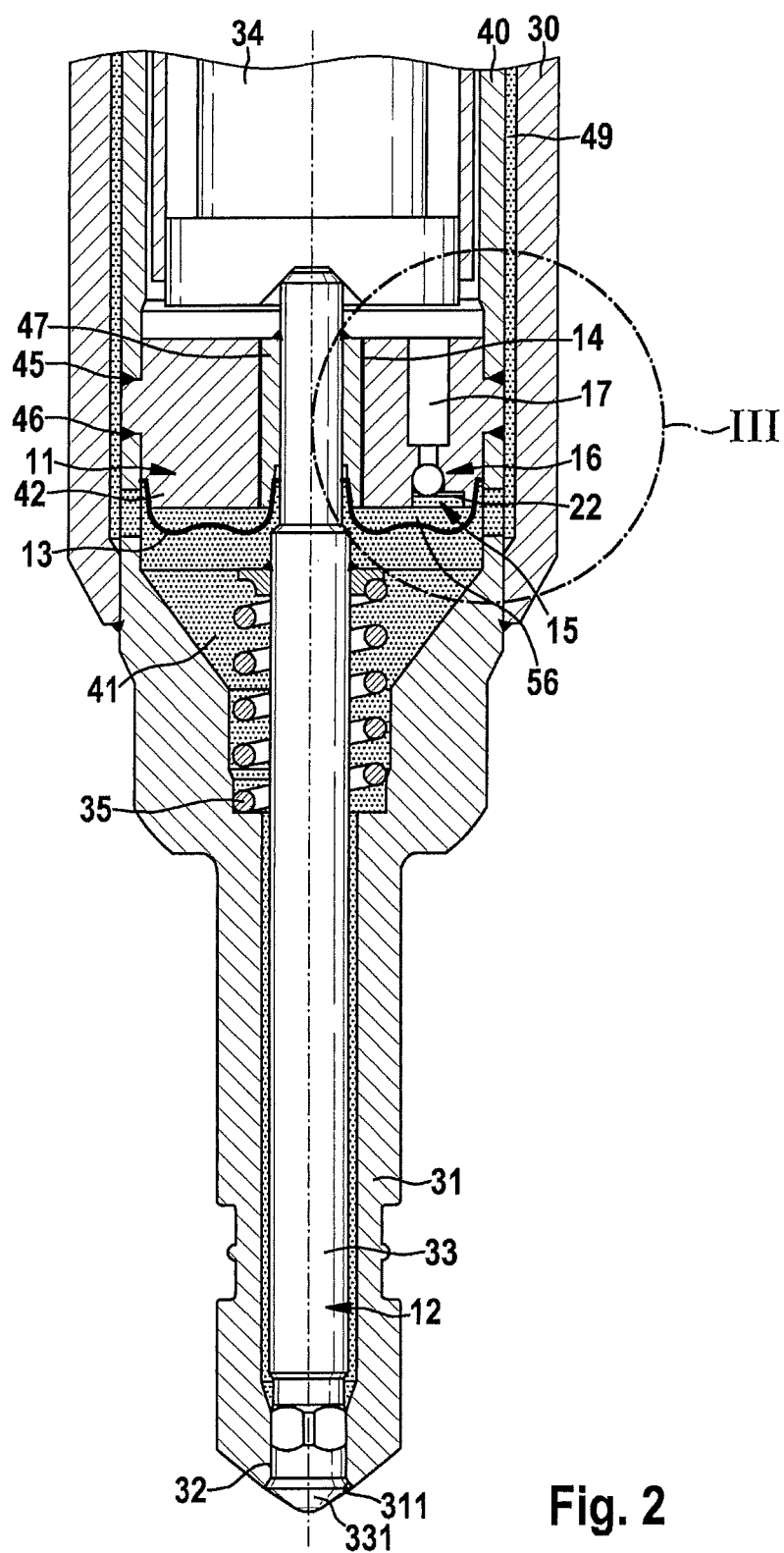
FIG. 2 shows an enlarged illustration of a longitudinal section of the lower part of the valve shown in a side view in FIG. 1.
Figure 3:
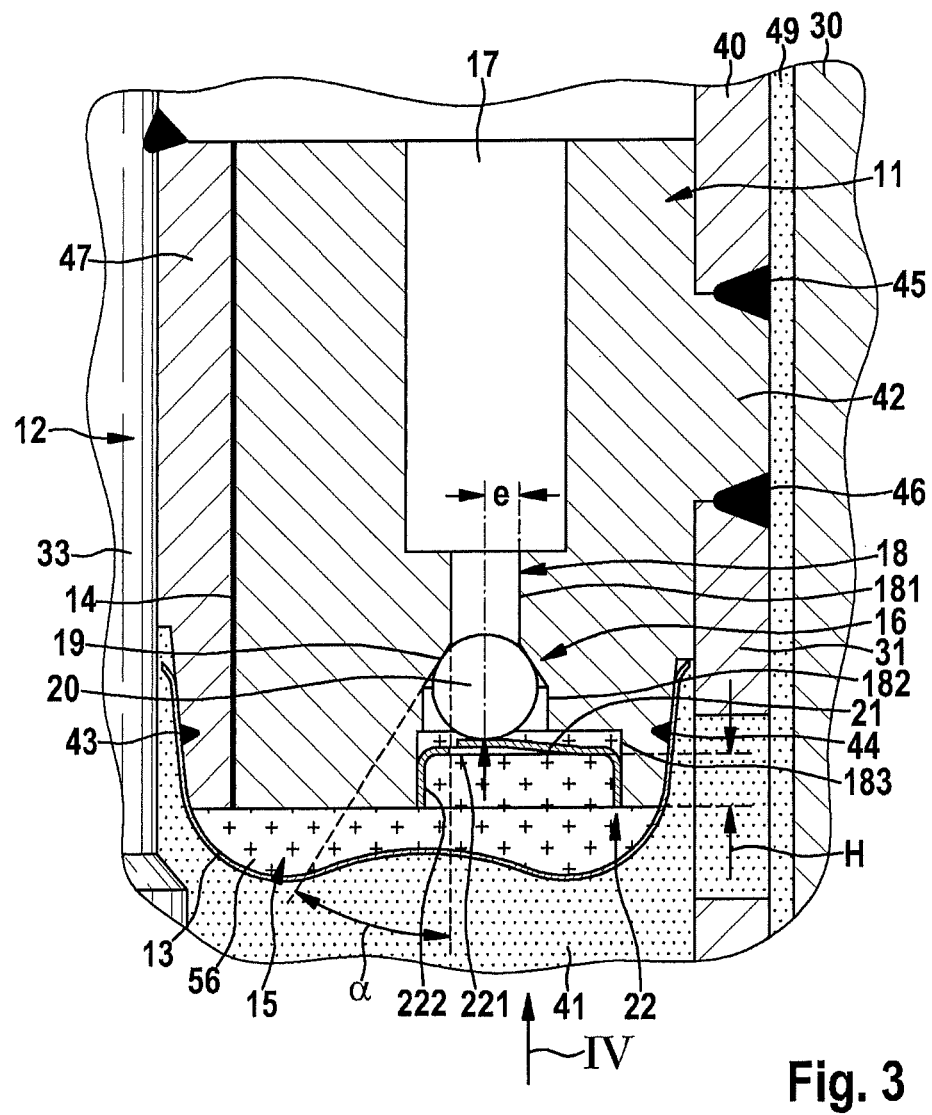
FIG. 3 shows an enlarged illustration of cutout III in FIG. 2.
Figure 4:
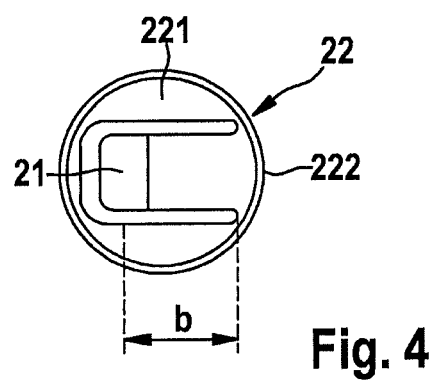
FIG. 4 shows a view from below of a spring element in the valve in the direction of arrow IV in FIG. 3.
Figure 5:
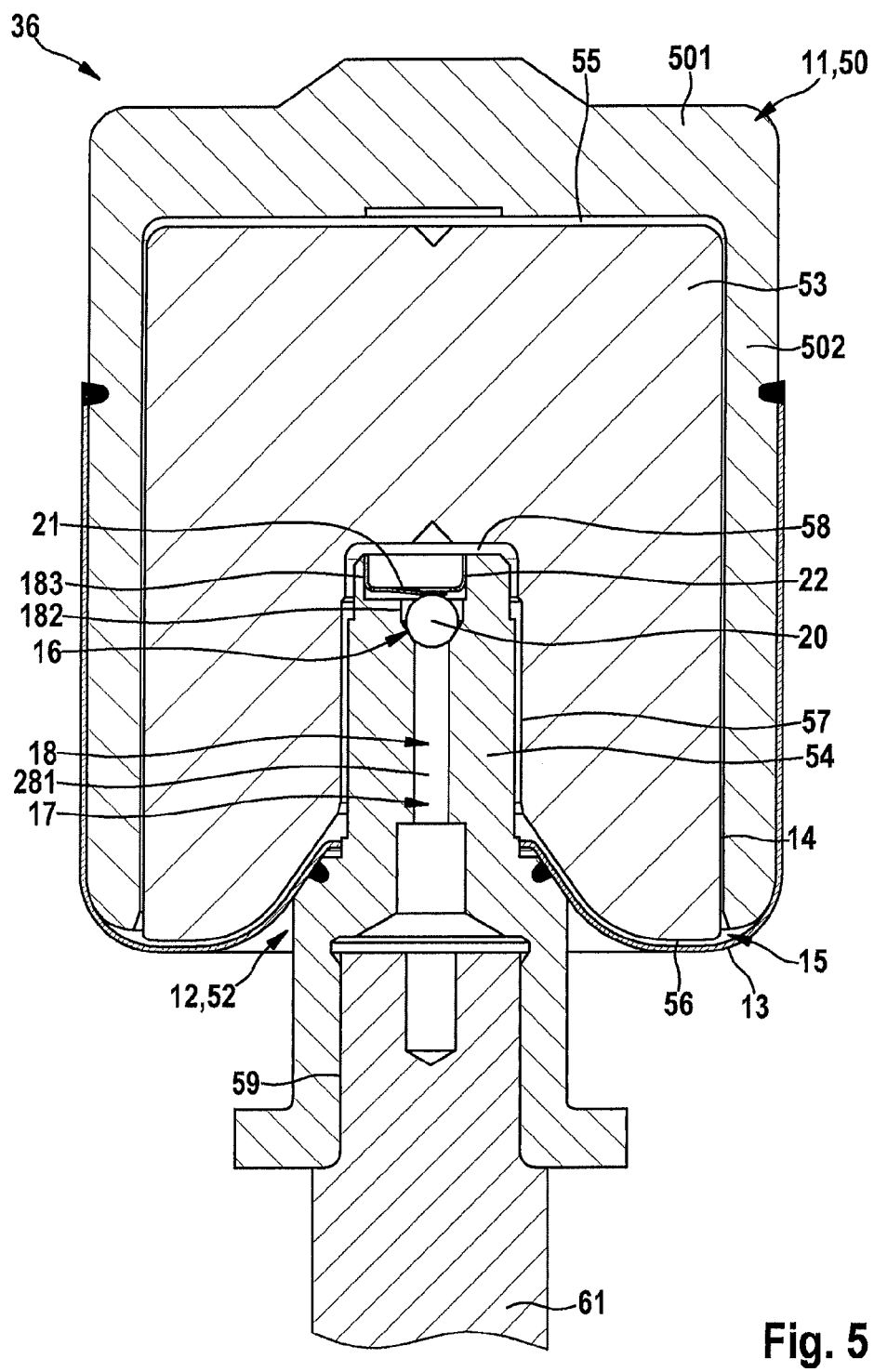
FIG. 5 shows a longitudinal section of a hydraulic coupler in the valve according to FIG. 1.

The novel assembly introduced here is described below in connection with its insertion into a valve for metering a fluid, such as into a fuel injector for fuel in a fuel injection system for internal combustion engines. In such a valve as shown in FIG. 1, the assembly may be used advantageously for sealing a valve chamber in the valve housing, as shown in FIGS. 2 and 3, and/or as an hydraulic coupler situated in the valve housing, as shown in FIGS. 4 and 5.

The assembly (FIGS. 2 through 6) has a first component 11, a second component 12 enclosed by first component 11, a flexible, for instance, annular diaphragm 13 which is secured on first and second components 11, 12 and covers a radial gap 14 that is present between components 11, 12, and a volume 15 of a medium enclosed by components 11, 12 and diaphragm 13. The medium is a liquid or a soft and kneadable substance, but may also be a gas in special cases of application. For the introduction of the medium, a filling valve is situated in one of components 11, 12, which opens in the direction of enclosed volume 15. Filling valve 16 is developed as a check valve having spring resetting and is situated in a filling channel 17 running in first component 11 or in second component 12. As may be seen in the sectional representation of the enlarged cutout according to FIG. 3, filling channel 17 is developed having a first boring section 181 and a second boring section 182 that is greater in diameter compared to the former, as well as a third boring section 183 adjacent to second boring section 182. At the transition from the first to the second boring section 181, 182, a valve seat 19 is developed for a spring-loaded valve member 20. Third boring section 183 has a larger diameter compared to the diameter of second boring section 182 and is situated eccentrically to the boring axis. In third boring section 182, a spring arm 21 is fixed that stresses valve member 20 in the valve closing direction, i.e. in the direction of valve seat 21. Valve member 20 is preferably a steel ball coated with PTFE, and valve seat 19, for optimal sealing of the ball, has an angle of slope a of between 5° and 60°, measured with respect to the axis of the bores. Spring arm 21 lying with force-locking on valve member 20 is part of a shell-shaped spring element 22 having a shell bottom 221 and a shell edge 222 (FIGS. 3 and 4) and is stamped out of shell bottom 221. To set the spring force of spring arm 21 that acts upon valve member 20, spring element 22 is placed at a height H (FIG. 3) into third boring section 183 and fastened there, which takes place by pressing in or welding in shell edge 222. Spring element 22 is a stamped and bent part made high-strength spring steel. Because of the eccentricity of third boring section 183, as large as possible a bending length b (FIG. 4) of spring arm 21 is achieved.

To insert the medium after assembling the assembly, the assessment is first vented, that is, volume 15 held in reserve for the medium is evacuated between components 11 and 12 and diaphragm 13, for which filling valve 16 is opened. For this, an axial displacement force is applied to valve member 20 through first boring section 181 of stepped hole 18, which lifts valve member 20 off valve seat 19 against the resetting force of spring arm 21. After the venting of the assembly, filling valve 16 closes on valve member 20 by the omission of the displacement force. Subsequently, via a filling tube introduced up to first boring section 181, the medium is reliably inserted, using a pressure which exceeds the spring force of spring arm 21, into the assembly, so that the specified volume 15 is completely filled with the medium. The closing force acting upon valve member 20 is now increased by the pressure prevailing in enclosed volume 15.

Figure 1:
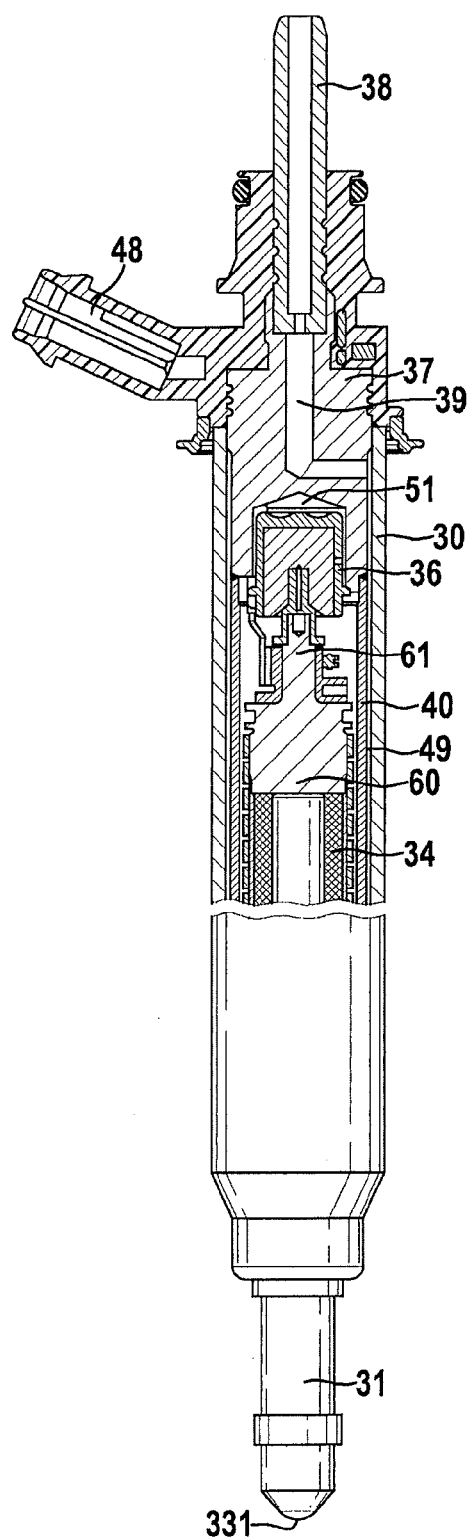
FIG. 1 shows a valve for metering fluid, in partial section.

The valve for metering a fluid, particularly fuel, in which the assembly described is preferably used, is shown in FIG. 1 in partial section. The valve has a valve housing 30, in a known manner, in whose one housing end a valve-seat support 31 is securely inserted. At the free end of valve-seat support 31 facing away from valve housing 30, a metering opening 32 is situated (FIG. 2) which is able to be controlled by a closure head 331 formed on a valve needle 33 in connection with a valve seat 311 developed on valve-seat support 31. Valve needle 33 is operated by a piezoelectric actuator or magnetostrictive actuator 34 against the restoring force of valve closing spring 35, actuator 34 being connected to a hydraulic coupler 36, which is supported in valve housing 30 Cardanically. For this purpose, the other end of valve housing 30 is closed using a connecting piece 37, in which an inlet bore 39 is developed having a connection piece 38 for supplying fluid. Actuator 35 and hydraulic coupler 36 are situated in a housing tube 40 that is fastened to connecting piece 37, and between valve housing 30 and housing tube 40 there is an annular gap 49, which connects inlet bore 39 in connecting piece 37 to a valve chamber 41 that is connected upstream of metering opening 32 in valve-seat support 31.

As shown In FIGS. 2 and 3, the assembly described above is used for sealing valve chamber 41, and, with that, housing tube 40 including non-fluid or fluid-resistant actuator 34, from the fluid located in valve chamber 41. In this context, first component 11 forms a valve body 42, bordering valve chamber 41, which is on one end connected to the end of housing tube 40 and on the other end to valve-seat support 31, securely in each case, and fluid-tight (welding seams 45 and 46 in FIGS. 2 and 3). Second component 12 forms valve needle 33, which is guided through valve body 42 while leaving radial gap 14. Annular, flexible diaphragm 13 is fastened by its inner edge to valve needle 33 and by its outer edge on valve body 42, in each case fluid-tight, which is symbolized by welding seams 43 and 44 in FIGS. 2 and 3. From a standpoint of production engineering, valve needle 33 carries a fixed slide ring 47 for guiding it in valve body 42, so that radial gap 14 is present between slide ring 47 representing a part of valve needle 33 and valve body 42, and the inner edge of diaphragm 13 is fastened to slide ring 47. Filling channel 17 including filling valve 16 is situated in valve body 42 and enclosed volume 15 of the medium is concentrated in a covering region 56 covered by diaphragm 13 on valve body 42. The medium in enclosed volume 15 is a soft substance having a high yield stress, for instance, a Bingham fluid, a viscous silicone oil, soft or kneadable material, such as an elastomer or transformer oil.

Figure 6:
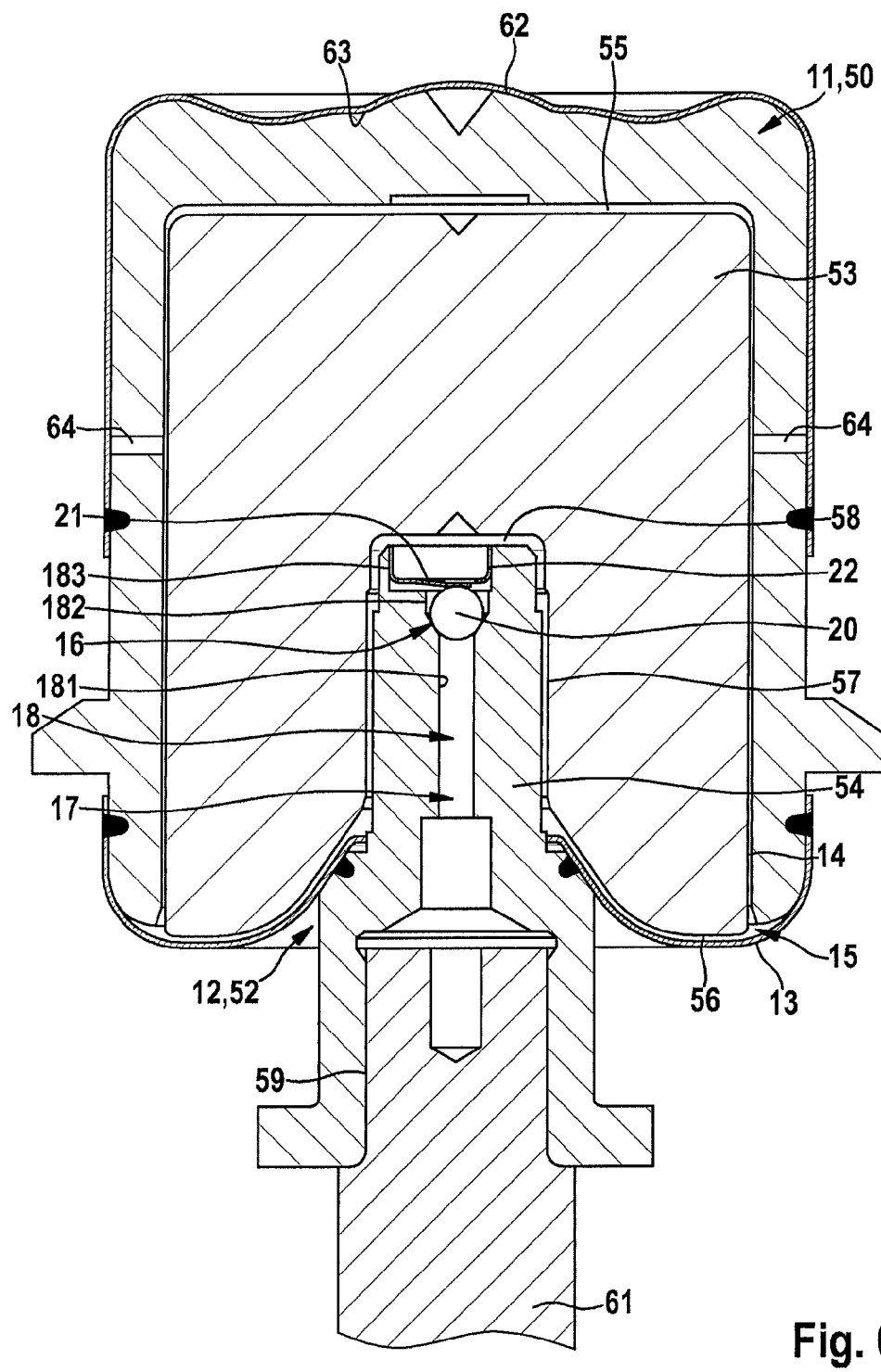
FIG. 6 shows an identical representation as in FIG. 5, showing a modified hydraulic coupler.

As shown in FIGS. 5 and 6, the assembly described in the valve according to FIG. 1 is also used for implementing hydraulic coupler 36. For this, first component 11 forms a pot-shaped coupling housing 50, having a pot bottom 501 and a pot jacket 502, which is supported Cardanically in a recess 51 in connecting piece 37. Second component 12 forms a coupling member 52 that is axially displaceable, and able to be acted upon by a force transmission element, in this case actuator 34, which has a piston 53, guided slidingly in a coupling housing 50 and a coupling bolt 54 that is rigidly connected to piston 53 for connecting the force transmission element, in this case actuator 34. Piston 53 borders radial gap 14 with pot jacket 502 of coupling housing 50 and with pot bottom 501 a coupling gap 55. Filling valve 16 is situated in coupling member 52, and enclosed volume 15 of the medium is distributed via radial gap 14 to covering region 56 diaphragm 13 fixed on coupling housing 50 and coupling member 52 and to coupling gap 55. As the medium, a fluid is used, such as an hydraulic oil.

As shown in FIG. 5, the fixing of diaphragm 13 on the coupling member side takes place on coupling bolt 54. Coupling bolt 54 is fastened in a recess 57 present in piston 53, and, with the base of recess 57, it borders a hollow space 58, which is connected to covering region 56. Filling channel 17, having filling valve 16 integrated into it, runs in coupling bolt 54 and opens out into hollow space 58, so that volume 15, enclosed by coupling housing 50, piston 53 and diaphragm 13, of the medium extends into hollow space 58. Coupling bolt 54, at its end protruding from piston 53, is provided with a hollow 59 and actuator 34 is provided with a force transmission plate 60, at which a lug 61 that dips into hollow 59 in coupling bolt 54 is connected in an attached form. Lug 61 is fixed in hollow 59, by being pressed in, for example. Actuator 34 is able to be supplied with current via an electrical plug connector 48 that is connected in an attached form to valve housing 30.

The unit of actuator 34 and hydraulic coupler 36 is mounted, under the effect of valve closing spring 35, with force-locking between valve needle 33 and connecting piece 37. If a change in temperature causes a different expansion of actuator 34 and valve housing 30, then the pressure of piston 53 on coupler gap 55 increases. The increased pressure in coupler gap 55 causes the medium to be expelled from coupler gap 55, and it is displaced via radial gap 14 into covering region 56 of diaphragm 13. If the piston pressure on coupler gap 55 decreases again due to the temperature change, diaphragm 13 generates a sufficiently high pressure force to press back the medium from covering region 56 into coupler gap 55 again, via radial gap 14, while simultaneously displacing piston 53.

Hydraulic coupler 36, shown in longitudinal section in FIG. 6, is modified in comparison to hydraulic coupler 36 described in FIG. 5 to the extent that, in addition to diaphragm 13, on the outside of coupling housing 50, facing away from coupling gap 55, a second diaphragm 62 is situated which spans pot bottom 501 of coupling housing 50 and is fixed, in a medium-tight manner, on pot jacket 502 of coupling housing 50, that is, liquid-tight. Between second diaphragm 62 and coupling housing 50 there remains an equalization chamber 63 which is in connection to coupling gap 55 via at least one bore 64 in pot jacket 502 and via radial gap 13. Alternatively, equalization chamber 63 may also be connected directly to coupling gap 55 via an axial bore provided in pot bottom 501. Equalization chamber 63 is also filled with medium via the existing connection to covering region 56 of diaphragm 13 to hollow space 58 at the bottom of recess 57 in piston 53. Equalization chamber 63 increases the altogether enclosed volume 15 of the medium, so that greater thermal expansion differences of valve housing 30 and the unit of actuator 34 and valve needle 33 (FIG. 1) are able to be compensated for. In all other respects, hydraulic coupler 36 according to FIG. 6 corresponds to that shown in FIG. 5, so that identical components have been provided with matching reference numerals.

What is claimed is:

1. An assembly comprising: a first component; a second component enclosed by the first component; a diaphragm which covers a radial gap between the first and second components and is fixed in a sealing manner on the first and second components; and a volume of a medium enclosed by the first and second components and the diaphragm; wherein a filling valve for inserting the medium is situated in one of the first and second components, wherein the filling valve is situated in a filling channel running in one of the first and second components, the filling channel beginning on an outer side of the one of the first and second components, and wherein the filling valve is configured as a check valve having a spring resetting.

2. The assembly as recited in claim 1, wherein the filling channel is configured as a stepped borehole having a first boring section and a second boring section having a larger diameter, and at the transition from the first to the second boring section there is a valve seat for a valve member.

3. The assembly as recited in claim 2, wherein the stepped borehole has a third boring section following the second boring section which is situated, having a larger diameter compared to the diameter of the second boring section, eccentrically to the boring axis; and in the third boring section a spring arm is fixed that stresses the valve member.

4. The assembly as recited in claim 3, wherein the spring arm is cut free as a part of a shell-shaped spring element having a shell bottom and a shell edge from shell bottom; and the spring element with the shell edge is set undisplaceably into the third boring section.

5. The assembly as recited in claim 4, wherein the spring element (22) is a stamped and bent part made of high-strength spring steel.

6. The assembly as recited in claim 2, wherein the valve member is a steel ball coated with PTFE.

7. The assembly as recited in claim 6, wherein the valve seat has an angle of slope a with respect to the boring axis of between 5° and 60°.

8. The assembly as recited in claim 1, wherein the assembly is positioned in a valve housing of a valve for metering fluid.

9. The assembly as recited in claim 8, wherein the first component forms a valve body closing a valve chamber in the valve housing and the second component forms a valve needle guided slidingly in the valve body for controlling a metering opening connected downstream of the valve chamber; and the filling channel which includes the filling valve is situated in the valve body and the enclosed volume is in a covering region covered by the diaphragm on the valve body.

10. The assembly as recited in claim 9, wherein the medium is a soft substance having a high yield stress, including one of a Bingham fluid, a kneadable material, an elastomer, a viscous silicone oil and a transformer oil.

11. The assembly as recited in claim 8, wherein in a hydraulic coupler integrated into the valve housing, the first component forms a pot-shaped coupling housing having a pot bottom and a pot jacket and the second component forms a coupling member, that is able to be acted upon by a force transmission element, having a piston guided slidingly in the coupling housing and a coupling bolt, firmly connected to the piston, for connecting the force transmission element; the piston together with the pot jacket of the coupling housing borders on the radial gap and with the pot bottom of the coupling housing it borders on a coupling gap; and the filling channel including the filling valve is situated in the coupling member and the enclosed volume is distributed via the radial gap to a covering region covered by the diaphragm at coupling housing and coupling member and to coupling gap.

12. The assembly as recited in claim 11, wherein the fixing on the coupling member side of the diaphragm is done on the coupling bolt; the coupling bolt is fastened in a central recess held in reserve in piston and with the base of the recess borders on a hollow space that is in connection with the covering region of the diaphragm; and the filling channel including the filling valve runs in the coupling bolt and opens out into the hollow space and the enclosed volume extends into the hollow space.

13. The assembly as recited in claim 11, wherein the medium is an hydraulic oil.

14. An assembly comprising: a first component; a second component enclosed by the first component; a diaphragm which covers a radial gap between the first and second components and is fixed in a sealing manner on the first and second components; and a volume of a medium enclosed by the first and second components and the diaphragm; wherein a filling valve for inserting the medium is situated in one of the first and second components, wherein the filling valve is situated in a filling channel running in the one of the first and second components, the filling channel beginning on an outer side of the one of the first and second components, and wherein the filling valve is configured as a check valve having a spring resetting, wherein the filling valve is situated in a filling channel extending in the one of the first and second components, wherein the filling channel is configured as a stepped hole having a first boring section having a first diameter and a second boring section having a second diameter larger than the first diameter, and at the transition from the first to the second boring section, a valve seat for a valve member is provided, and wherein: the stepped hole has a boring axis; the stepped hole has a third boring section following the second boring section, the third boring section having a third diameter larger than the second diameter of the second boring section; the third boring section is situated eccentrically to the boring axis; and a spring arm is fixed in the third boring section, the spring arm stressing the valve member.

15. The assembly as recited in claim 14, wherein:
the spring arm is cut free as a part of a shell-shaped spring element having a shell bottom and a shell edge from shell bottom; and
the spring element with the shell edge is set undisplaceably into the third boring section.

16. The assembly as recited in claim 15, wherein the spring element is a stamped-and-bent element made of high strength spring steel.

17. The assembly as recited in claim 15, wherein the valve member is a steel ball coated with PTFE.

18. The assembly as recited in claim 17, wherein the valve seat has an angle of slope with respect to the boring axis of between 5° and 60°.

19. The assembly as recited in claim 15, wherein the assembly is positioned in a valve housing of a valve for metering fluid.

20. The assembly as recited in claim 19, wherein:
the first component forms a valve body closing a valve chamber in the valve housing;
the second component forms a valve needle guided slidingly in the valve body for controlling a metering opening connected downstream of the valve chamber;
the filling channel which includes the filling valve is situated in the valve body; and
the enclosed volume is concentrated in a covering region covered by the diaphragm on the valve body.

21. The assembly as recited in claim 20, wherein the medium is one of a Bingham fluid, a kneadable material, an elastomer, a viscous silicone oil or transformer oil.

22. The assembly as recited in claim 19, wherein:
in a hydraulic coupler integrated into the valve housing, the first component forms a pot-shaped coupling housing having a pot bottom and a pot jacket, and the second component forms a coupling member configured to be acted upon by a force transmission element, the coupling member having a piston guided slidingly in the coupling housing and a coupling bolt, firmly connected to the piston, for connecting the force transmission element;
the piston and the pot jacket of the coupling housing together border on the radial gap;
the piston and the pot bottom of the coupling housing together border on a coupling gap; and
the filling channel including the filling valve is situated in the coupling member, and the enclosed volume is distributed via the radial gap (i) to a covering region covered by the diaphragm at coupling housing and coupling member, and (ii) to a coupling gap.

23. The assembly as recited in claim 22, wherein:
the fixing on the coupling member side of the diaphragm is performed on the coupling bolt;
the coupling bolt is fastened in a central recess held in reserve in piston;
the coupling bolt and the base of the recess together border on a hollow space which is in connection with the covering region of the diaphragm; and
the filling channel including the filling valve extends in the coupling bolt and opens out into the hollow space, and the enclosed volume extends into the hollow space.

24. The assembly as recited in claim 22, wherein the medium is hydraulic oil.

* * * * *